United States Patent
Oude Vrielink

(10) Patent No.: US 10,815,983 B2
(45) Date of Patent: Oct. 27, 2020

(54) END FITTING FOR A TUBE HOUSED BY A CAVITY AND A METHOD OF INSTALLING A TUBE IN A CAVITY

(71) Applicant: Watson-Marlow Bredel B.V., Delden (NL)

(72) Inventor: Ronald Oude Vrielink, Delden (NL)

(73) Assignee: Watson-Marlow Bredel B.V., Delden (NL)

(*) Notice: Subject to any disclaimer, the term of this patent is extended or adjusted under 35 U.S.C. 154(b) by 886 days.

(21) Appl. No.: 15/105,519

(22) PCT Filed: Nov. 18, 2014

(86) PCT No.: PCT/EP2014/074856
§ 371 (c)(1),
(2) Date: Jun. 16, 2016

(87) PCT Pub. No.: WO2015/090796
PCT Pub. Date: Jun. 25, 2015

(65) Prior Publication Data
US 2016/0312774 A1 Oct. 27, 2016

(30) Foreign Application Priority Data
Dec. 16, 2013 (GB) .................... 1322201.3

(51) Int. Cl.
*F16L 33/00* (2006.01)
*F04B 43/00* (2006.01)
(Continued)

(52) U.S. Cl.
CPC ........ *F04B 43/0072* (2013.01); *F04B 43/009* (2013.01); *F04B 43/1253* (2013.01);
(Continued)

(58) Field of Classification Search
CPC .. F04B 43/0072; F04B 53/16; F04B 43/1261; F04B 43/009; F04B 43/1253; F16L 33/225; A23C 3/07
See application file for complete search history.

(56) References Cited

U.S. PATENT DOCUMENTS

| | | | | |
|---|---|---|---|---|
| 364,947 A | * | 6/1887 | Moore | .................... F16L 21/04 |
| | | | | 277/620 |
| 1,309,145 A | * | 7/1919 | Mann | ...................... F16L 21/04 |
| | | | | 277/620 |

(Continued)

FOREIGN PATENT DOCUMENTS

| | | |
|---|---|---|
| CA | 2283664 A1 | 9/1998 |
| EP | 0569875 A1 | 11/1993 |

(Continued)

OTHER PUBLICATIONS

Canadian Office Action for Application No. 2,933,977 dated May 17, 2017.

(Continued)

*Primary Examiner* — David Bochna
*Assistant Examiner* — James A Linford
(74) *Attorney, Agent, or Firm* — Honigman LLP

(57) ABSTRACT

An end fitting for a tube housed by a cavity and a method of installing a tube in a cavity are described which use a compression ring that defines a void having an axial extent and a radial extent. The compression ring is compressed between a bracket of the end fitting and a port of the cavity by drawing the bracket axially towards the port. This seals the port and deforms the void defined by the compression ring. The deformation of the void reduces its axial extent and increases its radial extent, thereby compressing the tube against an insert received within the interior of the tube.

21 Claims, 8 Drawing Sheets

(51) Int. Cl.
*F04B 43/12* (2006.01)
*F04B 53/16* (2006.01)
*F16L 33/22* (2006.01)

(52) U.S. Cl.
CPC .......... *F04B 43/1261* (2013.01); *F04B 53/16* (2013.01); *F16L 33/225* (2013.01)

(56) References Cited

U.S. PATENT DOCUMENTS

| | | | | |
|---|---|---|---|---|
| 1,866,619 A | * | 7/1932 | Carson | F16L 21/04 277/621 |
| 1,873,620 A | * | 8/1932 | Moore | F16L 21/04 277/620 |
| 2,148,038 A | * | 2/1939 | Raybould | F16L 21/04 277/620 |
| 3,740,082 A | * | 6/1973 | Schustack | F16L 21/04 285/342 |
| 3,892,418 A | | 7/1975 | Felt | |
| 4,648,631 A | * | 3/1987 | Bryant | F16L 25/14 285/148.25 |
| 5,350,284 A | | 9/1994 | Wehling | |
| 5,868,696 A | | 2/1999 | Giesler et al. | |
| 6,220,635 B1 | | 4/2001 | Vitel et al. | |

FOREIGN PATENT DOCUMENTS

| | | |
|---|---|---|
| EP | 1607670 A1 | 12/2005 |
| EP | 002447532 A2 | 5/2012 |
| FR | 2519381 A1 | 7/1983 |
| FR | 2806148 A1 | 9/2001 |
| GB | 1224219 A | 3/1971 |
| JP | 58-146184 | 10/1983 |
| JP | 07-098084 | 4/1995 |
| JP | 3178198 B2 | 6/2001 |
| JP | 2008208898 A | 9/2008 |
| JP | 2009257520 A | 11/2009 |
| JP | 57-42738 B2 | 7/2015 |
| WO | WO-0202946 | 1/2002 |
| WO | 2007004343 A1 | 1/2007 |
| WO | WO-2013061020 A1 | 5/2013 |

OTHER PUBLICATIONS

Chinese Office Action for Application No. 201480075580.9 dated Mar. 29, 2017, along with English translation.
Notice of Allowance with Search Report dated Oct. 10, 2017 for Russian Application No. 2016128981/06.
U.K. Search Report for Application GB1322201.3 dated Aug. 28, 2014.
International Search Report for Application PCT/EP2014/074856 dated Feb. 23, 2015.
Japanese Office Action for Application No. 2016-541654 dated Feb. 27, 2018 along with English Translation.
Chinese Office Action for Application No. 201480075580.9 dated Feb. 14, 2018 along with English Translation.
Japanese Office Action for Application No. 2016-541654 dated Jun. 6, 2017 along with English Translation.
Mexican Office Action for Application No. MX/a/2016/007976 dated Aug. 28, 2019 along with English translation.
Indian Office Action for Application No. 201617020674 dated Aug. 7, 2019.

* cited by examiner

END FITTING FOR A TUBE HOUSED BY A CAVITY AND A METHOD OF INSTALLING A TUBE IN A CAVITY

BACKGROUND

Peristaltic pumps are commonly used for applications in which it is undesirable for a pumped fluid to contact pump components. For example, peristaltic pumps are often used to pump sterilized or abrasive fluids where contact of the fluid with internal pump components would risk contaminating the fluid or damaging the pump. Peristaltic pumps are therefore often used in the food industry in which sterile pumping processes are required and in the aggregates industry in which slurries containing abrasive particles need to be transferred.

Peristaltic pumps generally comprise a pump housing, a rotor assembly arranged within the pump housing, and a flexible tube disposed between the pump housing and the rotor assembly. The rotor assembly typically comprises a pair of pressing shoes which, when the rotor assembly is rotated, move along the tube to exert a peristaltic action on the tube.

Suction and discharge lines (typically, rigid in construction) are coupled to the tube via a pair of ports provided in the pump housing. The coupling of the suction and discharge lines to the tube must be fluid-tight to avoid any leakage of the pumped fluid.

In order to reduce the amount of wear on the tube and the pressing shoes and to dissipate heat, particularly where high operating pressures are required (often using reinforced hoses—such pumps being referred to as hose pumps), it is often desirable to provide a lubricating fluid within the pump housing. At the ports in the pump housing, it is therefore necessary to seal the tube against the pump housing to prevent the lubricating fluid from leaking out of the pump housing.

As described, the tube must therefore be sealed against the pump housing to avoid leakage of lubricating fluid and also sealed with the suction and discharge lines to avoid leakage of pumped fluid. FIGS. 1 and 2 show two examples of known end fittings which achieve such sealing.

In the example of FIG. 1, the end fitting comprises a rubber bush 1 which is received over the end of the tube (not shown). A bracket 3 is received over the bush 1 and connected to a port of the pump housing, such that a flange of the bush 1 is sandwiched between the bracket 3 and the port. The flange of the bush 1 seals against the pump housing to prevent lubricating fluid from leaking out of the pump housing.

A hose clamp 5 is received over the bush 1 with the tube disposed therein.

A flange 7 is connected to the bracket 3 and an insert 9 is located in an opening passing through the flange 7. The insert 9 extends through the flange 7 and into the interior of the tube. The hose clamp 5 is then tightened to seal the tube against the insert 9.

As shown in FIG. 2, the bush 1 may be replaced by an O-ring 11. Essentially, the O-ring 11 serves the same purpose as the bush 1 and seals against the pump housing to prevent lubricating fluid from leaking out of the pump housing.

As well as their sealing functions, the end fittings shown in FIGS. 1 and 2 also fasten the tube in position and thus provide strain relief against the movement of the rotor.

Although the end fittings shown in FIGS. 1 and 2 provide adequate sealing properties, they can be somewhat difficult and time-consuming to assemble. Moreover, the end fittings may be incorrectly assembled resulting in leakage of the pumped fluid and/or lubricating fluid, and/or poor performance of the pump caused by air intake at the suction port.

SUMMARY

According to an aspect of the invention, there is thus provided an end fitting for a tube housed by a cavity, the end fitting comprising: a bracket having a first abutment shoulder which opposes a port of the cavity; a compression ring disposed against the first abutment shoulder of the bracket and configured to receive the tube therethrough, the compression ring defining a void having an axial extent and a radial extent; an insert configured to be received within the interior of the tube such that the insert overlaps and extends beyond the compression ring; and a fastener for connecting the bracket to the port so as to draw the bracket axially towards the port, whereby the compression ring is compressed between the first abutment shoulder and the port so as to seal the port and such that the void defined by the compression ring is deformed; wherein the deformation of the void reduces its axial extent and increases its radial extent, thereby compressing the tube against the insert.

The compression ring may have an inner diameter which, in an at-rest configuration, is greater than or substantially equal to an outer diameter of the tube, and which, in a compressed configuration, is less than the outer diameter of the tube.

The cavity may be defined by a pump housing of a peristaltic pump.

The void may be defined by the cross-section of the compression ring and may be located between the compression ring and the tube, bracket, and/or port.

The cross-section of the compression ring may define one or more annular channels.

The cross-section of the compression ring may define a plurality of annular channels spaced axially from one another.

The cross-section of the compression ring may define a plurality of annular channels oriented in different directions with respect to one another.

The void may be located within the cross-section of the compression ring.

The compression ring may be hollow.

The compression ring may be formed by a foam material having pores which define a plurality of voids.

The bracket may comprise an annular portion which is configured to receive the tube therein.

The annular portion may have a second abutment shoulder against which the tube abuts.

An opening may be provided through the annular portion, the opening being located adjacent the second abutment shoulder.

The insert may comprise an axial portion which is configured to be received within the interior of the tube. The insert may further comprise one or more projections which extend radially from the axial portion. The diameter of the one or more projections may be greater than the inner diameter of the tube, and the diameter of the remainder of the axial portion may be less than the inner diameter of the tube.

The axial portion may be received by the annular portion of the bracket. The annular portion may thus guide the insertion of the insert into the tube.

The insert may comprise an end portion which abuts the bracket.

The end portion of the insert may be a flange portion which abuts a corresponding flange portion of the bracket. The flange portion of the bracket may be configured to allow the bracket to be connected to a discharge or suction line.

The bracket may comprise an inner (flange) portion which abuts against a surface of the port so as to limit the compression of the compression ring.

The bracket may comprise a tongue or groove which is received by or receives a corresponding groove or tongue of the port.

The tongue and groove may be annular, the tongue housing the compression ring.

According to another aspect of the invention, there is provided a peristaltic pump comprising an end fitting as described previously.

According to another aspect of the invention, there is provided method of installing a tube in a cavity, the method comprising: locating the tube within the cavity such that an end of the tube projects out of a port of the cavity; placing a compression ring and a bracket over the end of the tube such that the compression ring is disposed between a first abutment shoulder and the port, the compression ring defining a void having an axial extent and a radial extent; placing an insert within the interior of the tube such that the insert overlaps and extends beyond the compression ring; and drawing the bracket axially towards the port, thereby compressing the compression ring between the first abutment shoulder and the port so as to seal the port and deform the void defined by the compression ring; wherein the deformation of the void reduces its axial extent and increases its radial extent, thereby compressing the tube against the insert.

Drawing the bracket axially towards the port may comprise a first compression stage in which the void reduces its axial extent and increases its radial extent, thereby compressing the tube against the insert, and a second compression stage in which the material of the compression ring is compressed to seal the compression ring against the bracket and the port.

Drawing the bracket axially towards the port may comprise drawing the bracket towards the port until an inner flange of the bracket abuts against a surface of the port.

For a better understanding of the present disclosure, and to show more clearly how it may be carried into effect, reference will now be made, by way of example, to the accompanying drawings, in which: —

DETAILED DESCRIPTION

Figure 3:
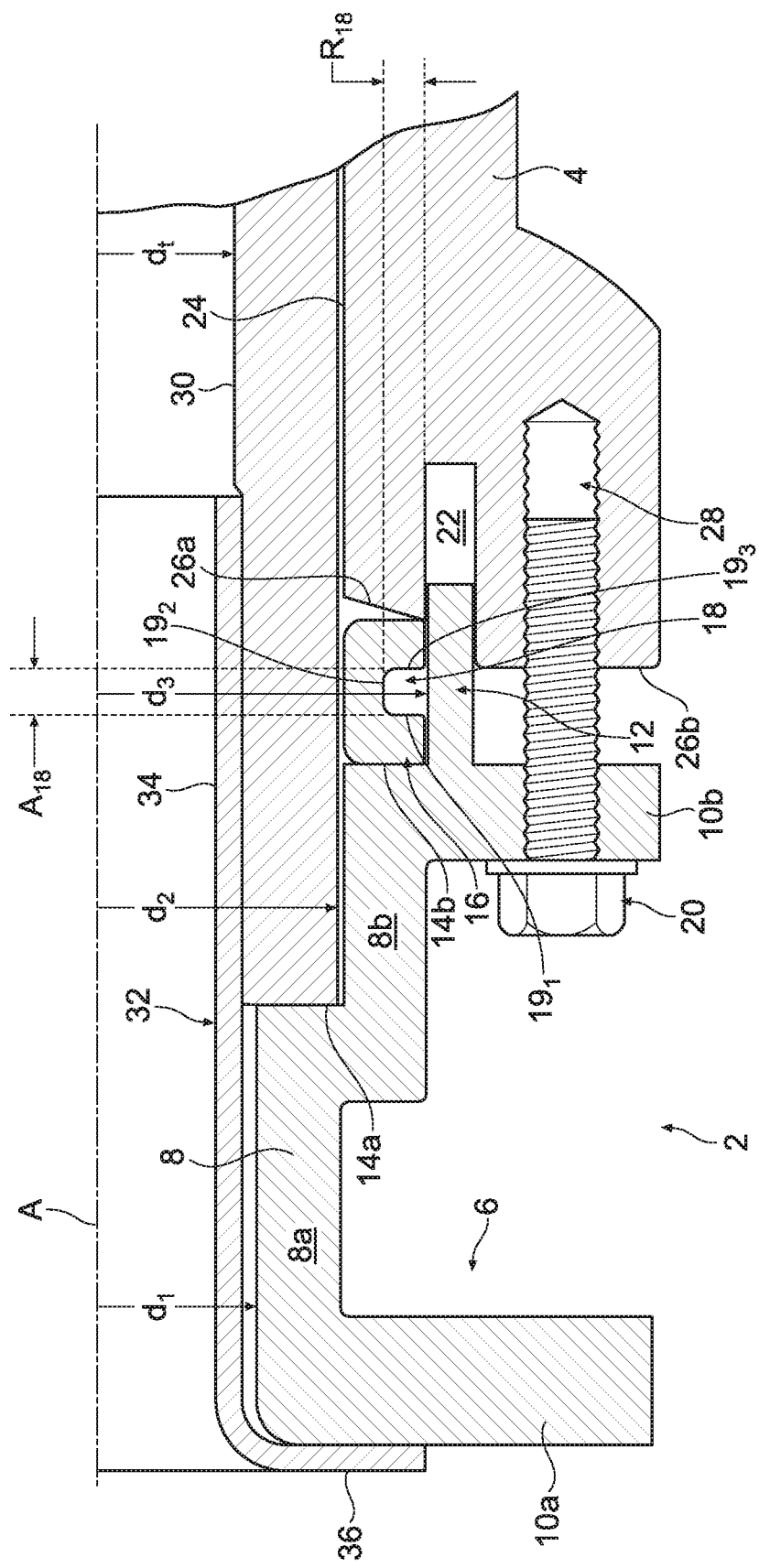
FIG. 3 is a cross-sectional view of an end fitting according to an embodiment of the invention, the end fitting being shown in a first stage of assembly.
Figure 4:
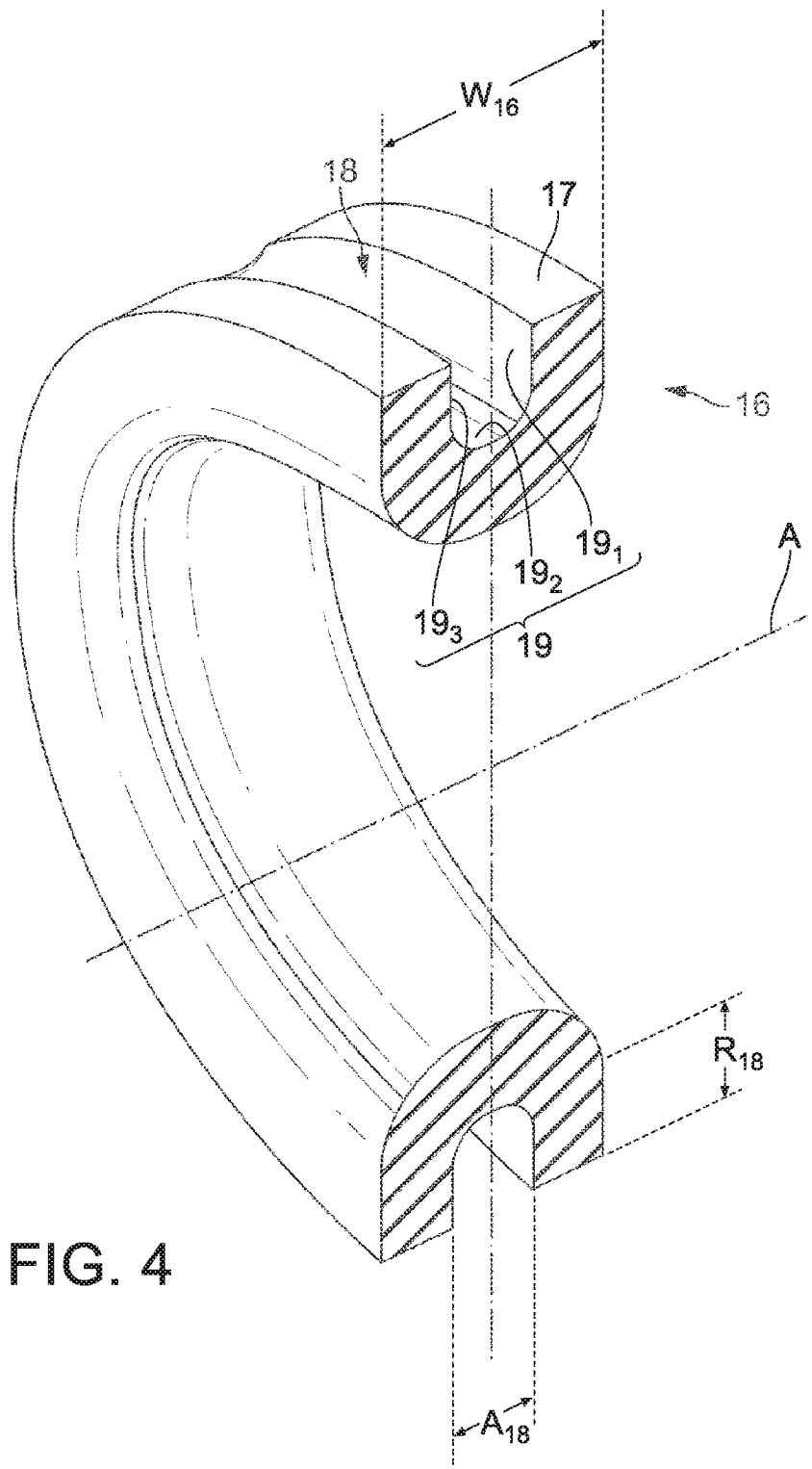
FIG. 4 is a cross-sectional perspective view of a compression ring of the end fitting of FIG. 3.
Figure 5:
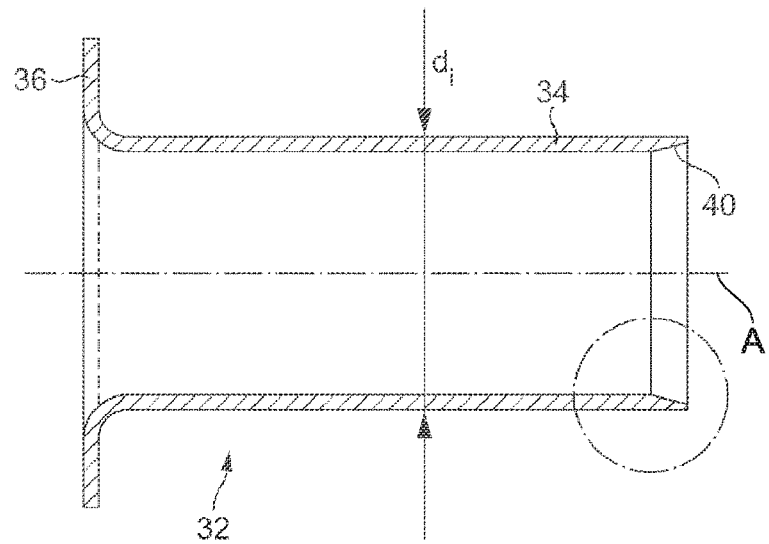
FIG. 5 is a cross-sectional view of an insert of the end fitting of FIG. 3.

FIG. 3 shows an end fitting 2 according to an embodiment of the invention which is configured to connect to a (suction or discharge) port 4 provided in a pump housing of a peristaltic pump. With reference to FIGS. 3,7-8, and 11-12, a longitudinal axis A is shown extending through an axial center of the end fitting 2. With reference to FIG. 4, the longitudinal axis A is also shown extending through an axial center of an exemplary compression ring 16 that is a component of the end fitting 2 seen at FIGS. 3,7-8, and 11-12. With reference to FIG. 5, the longitudinal axis A is also shown extending through an axial center of an exemplary insert 32 that is a component of the end fitting 2 seen at FIGS. 3,7-8, and 11-12.

The end fitting 2 comprises a bracket 6. The bracket 6 comprises a generally cylindrical axial portion 8 and outer and inner flange portions 10a, 10b which extend perpendicularly from either end of the axial portion 8 in a radial direction.

The axial portion 8 is formed by a first section 8a and a second section 8b which are stepped relative to one another. The first section 8a thus has an internal diameter d1 which is smaller than the internal diameter d2 of the second section 8b.

An annular tongue 12 projects from an inner surface of the inner flange portion 10b. The inner surface of the annular tongue 12 is stepped back from the inner surface of the second section 8b of the axial portion 8. The second section 8b thus has an internal diameter d2 which is smaller than the internal diameter d3 of the annular tongue 12.

As described, the first and second sections 8a, 8b of the axial portion 8 and the annular tongue 12 are stepped relative to one another such that a first radial abutment surface 14a (second abutment shoulder) is formed between the first and second sections 8a, 8b of the axial portion 8, and a second radial abutment surface 14b (first abutment shoulder) is formed between the second section 8b of the axial portion 8 and the annular tongue 12.

A compression ring 16 is disposed radially inboard of the annular tongue 12 and abuts the second radial abutment surface 14b. The compression ring 16 is formed of a flexible elastomeric material. As shown in FIG. 4, the compression ring 16 has a substantially U-shaped cross-section (which may also be described as C-shaped or semicircular) which is arranged such that an annular channel 18 (e.g., an annular void) defined by the U-shaped cross-section is directed radially outwardly. Furthermore, as seen at FIG. 3, the annual void or channel 18 may be defined by a radial extent $R_{18}$ and an axial extent $A_{18}$. The axial extent of the annular tongue 12 is greater than a width $W_{16}$ (see, e.g., FIG. 4)) of the compression ring 16, such that a portion of the annular tongue 12 projects past the compression ring 16.

As shown in FIG. 3, the annular channel 18 of the compression ring 16 faces the annular tongue 12. The compression ring 16 is sized relative to the second radial abutment surface 14b so that, in its at-rest configuration, the radially innermost surface of the compression ring 16 is substantially level with the inner surface of the second section 8b of the axial portion 8. In other words, the inner diameter of the compression ring 16 is substantially equal to the internal diameter d2 of the second section 8b. The compression ring 16 may, however, sit slightly proud of or slightly below the level of the inner surface of the second section 8b.

The inner flange portion 10b of the bracket 6 is provided with a number of openings spaced around its circumference which each receive a bolt 20 (and washer). The outer flange portion 10a of the bracket 6 may also be provided with a number of openings (now shown) spaced around its circumference for attaching the bracket to a discharge or suction line.

An end surface of the port 4 is provided with an annular groove 22 which is sized to receive the annular tongue 12 of the bracket 6. The annular groove 22 encircles the opening of the port 4 which is defined by a cylindrical inner surface 24 of the pump housing. The annular groove 22 divides the end surface of the port 4 into an inner radial abutment surface 26a and an outer radial abutment surface 26b. The inner radial abutment surface 26a is recessed below the level of the outer radial abutment surface 26b and has a conical taper. The conical taper may assist with the loading of a tube in the pump housing. The conical taper may also assist in releasing the compression ring 16 during disassembly.

The port 4 is provided with a plurality of threaded bores 28 which are spaced around the circumference of the port 4 and pass through the outer radial abutment surface 26b.

During a first stage of assembly, a tube 30 of the peristaltic pump is located within the pump housing. This may be achieved by introducing the tube 30 into the pump housing via one of the ports 4 and rotating a rotor of the pump to draw the tube 30 through the pump housing.

To allow a shoe of the rotor to grip the tube 30 and avoid the rotor slipping relative to the tube 30, an enlarged collar may be provided on one end of the tube 30. Accordingly, for a conventional hose-pump (C-shape) having a rotor with two shoes, it takes just a little more than half a revolution of the rotor to fully insert the tube 30 into the pump. This may be particularly beneficial where the pump operates at low speeds or where the rotor is rotated by hand to introduce the tube (and to pump the fluid).

The tube 30 is sufficiently long so that when it is inserted into the pump housing it projects a small distance from the port 4. The bracket 6 is then introduced over one end of the tube 30 and the annular tongue 12 of the bracket 6 is received by the annular groove 22 of the port 4 so that the inner radial abutment surface 26a of the port 4 opposes the second radial abutment surface 14b of the bracket 6, with the compression ring 16 disposed therebetween.

The bolts 20 pass through the openings in the inner flange portion 10b and engage in the threaded bores 28 to connect the bracket 6 to the port 4. The bolts 20 are tightened so as to draw the first radial abutment surface 14a of the bracket 6 into abutment with the end of the tube 30. As described previously, the compression ring 16 is substantially flush with the second radial abutment surface 14 when in its at-rest configuration. The tube 30 is therefore able to easily slide through the compression ring 16 and into second section 8b of the axial portion 8. The tightening of the bolts 20 also draws the annular tongue 12 of the bracket 6 towards and into the annular groove 22 of the port 4, and the second radial abutment surface 14b of the bracket 6 toward the inner radial abutment surface 26a of the port 4.

The bolts 20 are sufficiently long so that they initially engage in the threaded bores 28 without the inner radial abutment surface 26a of the port 4 coming into contact with the compression ring 16 (or at least not sufficiently to deform the compression ring 16 from its at-rest configuration). However, the portion of the annular tongue 12 which projects past the compression ring 16 is received in the annular groove 22.

With the tube 30 in abutment with the first radial abutment surface 14a, but with the compression ring 16 still in its at-rest configuration, an insert 32 is inserted into the bracket 6. As shown particularly in FIG. 5, the insert 32 comprises an axial portion 34 and a flange portion 36 which extends perpendicularly from the axial portion 34 in a radial direction.

The axial portion 34 of the insert 32 passes through the axial portion 8 of bracket 6 and into the interior of the tube 30, with the flange portion 36 of the insert 32 abutting the outer flange portion 10a of the bracket 6. The axial portion 8 of the bracket 6 thus guides the axial portion 34 of the insert 32 into the tube 30. The axial portion 34 of the insert 32 is sufficiently long so that it projects past the compression ring 16.

The cross-section of the axial portion 34 of the insert 32 is substantially uniform along its length and has a constant outer diameter, di, across its length. The outer diameter di may be substantially equal to or slightly larger than an inner diameter, dt, of the tube 30.

Figure 6:
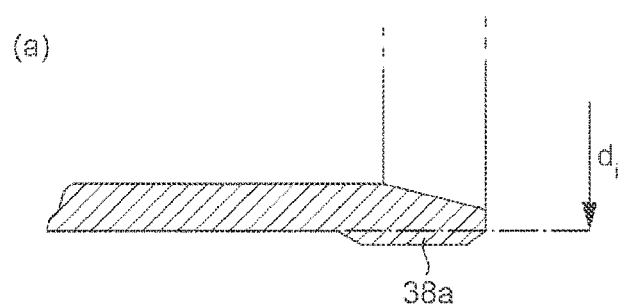
FIG. 6 is an enlarged view of an end portion of the insert showing two possible configurations.
Figure 6:
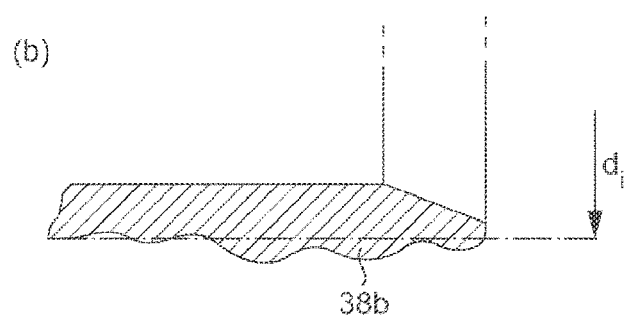

However, as shown in FIG. 6, at the free end of the axial portion 34 (i.e. the end spaced from the flange portion 36), one or more projections 38 may be formed which have a diameter that is greater than the remainder of the axial portion 34. For example, in FIG. 6(a), an enlarged collar 38a is provided around the axial portion 34, whereas, in FIG. 6(b), a series of radially extending barbs 38b are provided around the axial portion 34. The projections 38 are, however, only provided over a small proportion of the axial portion 34 which may amount to less than 10% of the total length of the axial portion 34.

In this case, the outer diameter di of the axial portion 34 of the insert 32 may be slightly less than the inner diameter dt of the tube 30 and the projections 38 may have a diameter which is greater than the inner diameter dt of the tube 30. Alternatively, both the outer diameter di of the axial portion 34 of the insert 32 and the diameter of the projections 38 may be substantially equal to or slightly larger than the inner diameter dt of the tube 30. Accordingly, the projections 38 provide some resistance to the insertion of the axial portion 34 of the insert 32 into the interior of the tube 30. The resistance is not, however, sufficient to cause the tube 30 to be pushed into the pump housing during the insertion of the insert 32.

As shown in FIGS. 5 and 6, an internal taper 40 is also provided at the free end of the axial portion 34 of the insert 32 to guide the pumped fluid from the tube 30 into the insert 32 or from the insert 32 into the tube 30.

Figure 7:
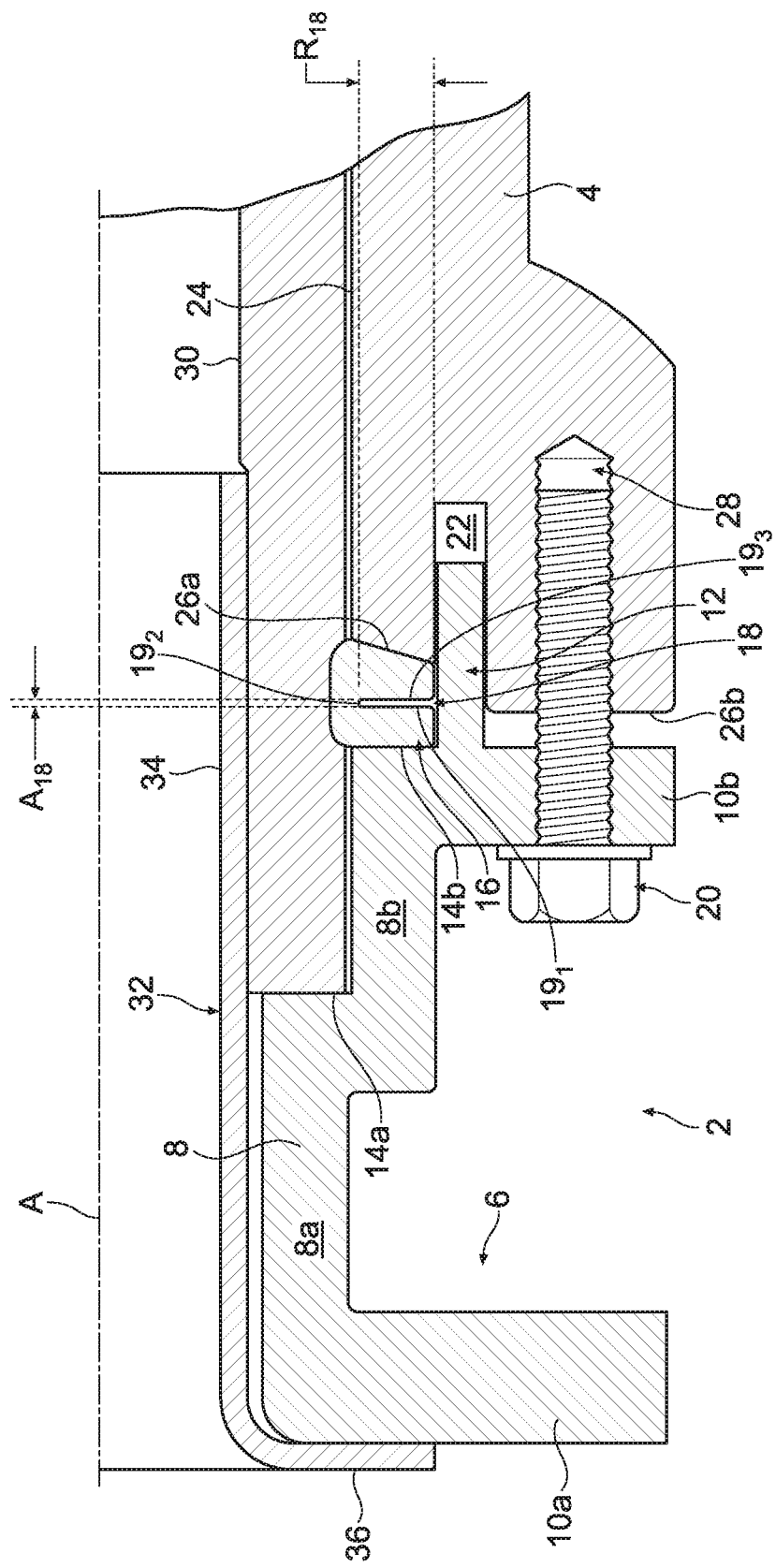
FIG. 7 is a cross-sectional view of the end fitting in a second stage of assembly.

With the insert 32 in place, the bolts can be further tightened so as to draw the second radial abutment surface 14b of the bracket 6 further toward the inner radial abutment surface 26a of the port 4. As shown in FIG. 7, this causes the compression ring 16 to compress and deform.

The compression of the compression ring 16 in the axial direction causes the radial extent of the compression ring 16 to increase. This is effected by the annular channel 18. The inner surface of the annular channel 18 has a constant surface area and thus any change in axial extent is necessarily converted into a corresponding change in radial extent. Moreover, as the compression ring 16 is supported by the annular tongue 12, the increase in the radial extent of the compression ring 16 is realized as a reduction in the inner diameter of the compression ring 16. Specifically, the inner diameter of the compression ring 16 becomes smaller than the internal diameter d2 of the second section 8*b* and, importantly, smaller than the outer diameter of the tube 30.

In this first stage of compression, opposing portions 19$_1$, 19$_3$ of the inner surface 19 of the annular channel 18 are forced toward one another to reduce the axial extent A$_{18}$ relative the longitudinal axis A and to increase the radial extent R$_{18}$ relative to (e.g., toward) the longitudinal axis A. In other words, the compression ring 16 is deformed in shape, but the material itself is not significantly compressed.

As described previously, the axial portion 34 of the insert 32 overlaps and extends beyond the compression ring 16. The deformation of the compression ring 16 thus forces the tube 30 against the axial portion 34 of the insert 32. Consequently, the compression ring 16 locks the position of the tube 30 and insert 32 relative to one another, and relative to the port 4 and the bracket 6. The axial portion 34 of the insert 32 extends sufficiently past the compression ring 16 and the inner radial abutment surface 26*a* so as to ensure that the insert 32 is not pushed outward during compression of the compression ring 16. However, the axial portion 34 of the insert 32 is short enough to ensure that the tube 30 makes a smooth transition onto the axial portion 34. In other words, the tube 30 seals (where it is compressed by the compression ring 16) as close as possible (taking into account the competing consideration described above) to the end of the axial portion 34. This improves hygiene since the pumped fluid is prevented from collecting between the tube 30 and the axial portion 34 in a region inward of the compression ring 16.

Figure 8:
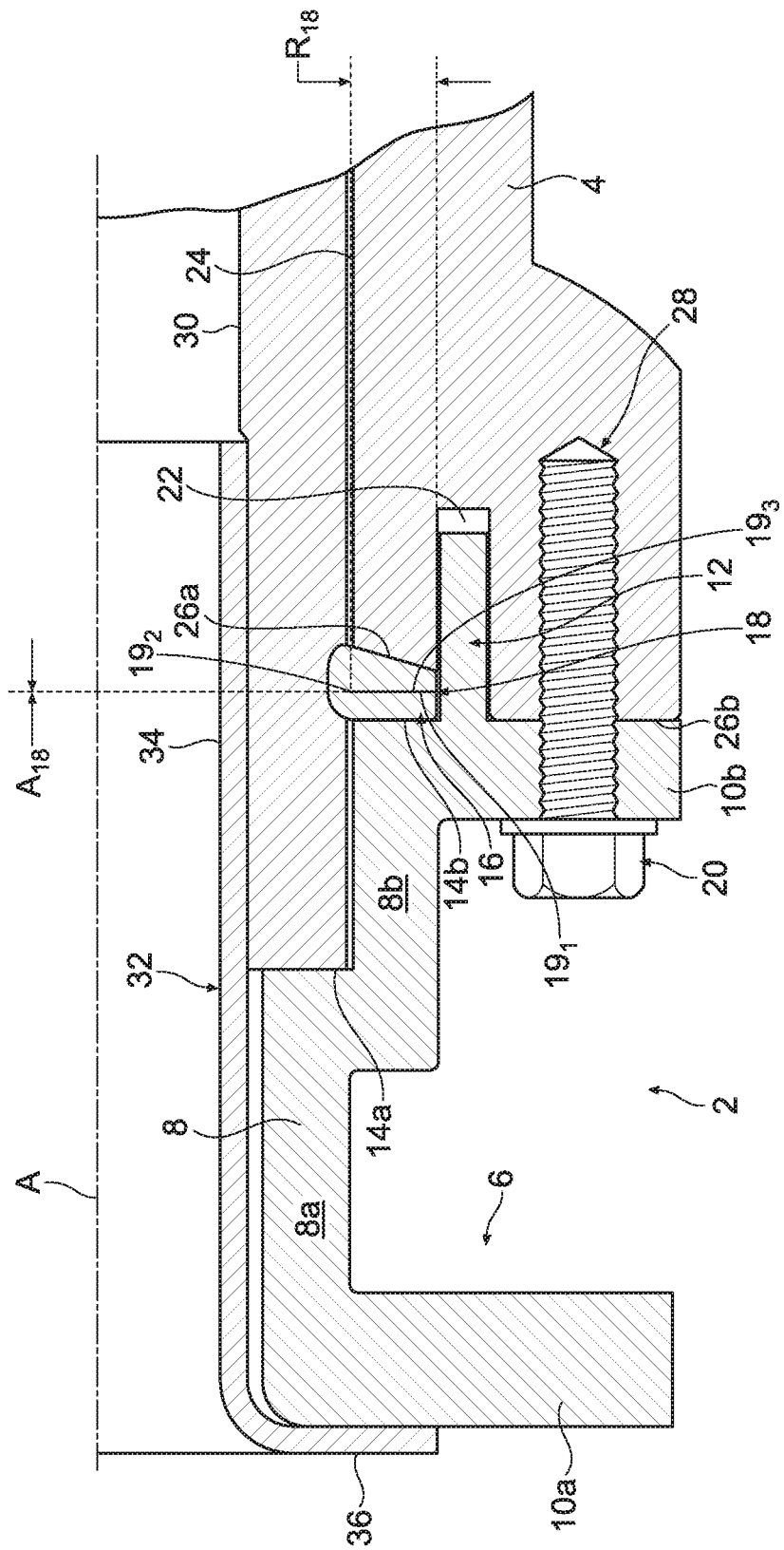
FIG. 8 is a cross-sectional view of the end fitting in a third stage of assembly.

As shown in FIG. 8, the bolts are further tightened until the inner flange portion 10*b* abuts the outer radial abutment surface 26*b*. This provides tactile feedback to the user to confirm that sufficient compression has been applied. The compression of the compression ring 16 is thus determined by the extent to which the inner radial abutment surface 26*a* is recessed below the level of the outer radial abutment surface 26*b*. This is configured to place the compression ring 16 under sufficient compression to achieve adequate sealing, whilst avoiding the compression ring 16 from becoming overstressed.

Following the first stage of compression, the opposing portions of the inner surface of the annular channel 18 have already been forced into contact with one another. Therefore, in this second stage of compression, the further compression of the compression ring 16 causes the material of the compression ring 16 itself to be compressed.

Although the compression ring 16 has been described as being oriented so that the annular channel 18 faces radially outward toward the annular tongue 12, other orientations may be used. In particular, the compression ring 16 may be oriented so that the annular channel 18 faces the tube 30, the second radial abutment surface 14*b* of the bracket 6 or the inner radial abutment surface 26*a* of the port 4.

Further, although the compression ring 16 has been described as having a U-shaped cross-section, many other forms of compression ring 16 may be used.

Figure 9:
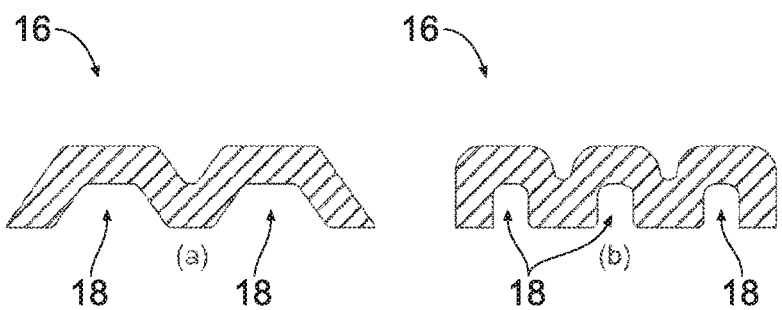
FIGS. 9 and 10 show examples of alternative cross-sections of the compression ring.

For example, as shown in FIG. 9, instead of the single annular channel 18 described previously, the compression ring may define a plurality of annular channels spaced axially from one another. Specifically, FIG. 9(*a*) shows a compression ring having two annular channels, whereas FIG. 9(*b*) shows a compression ring having three annular channels.

Figure 10:
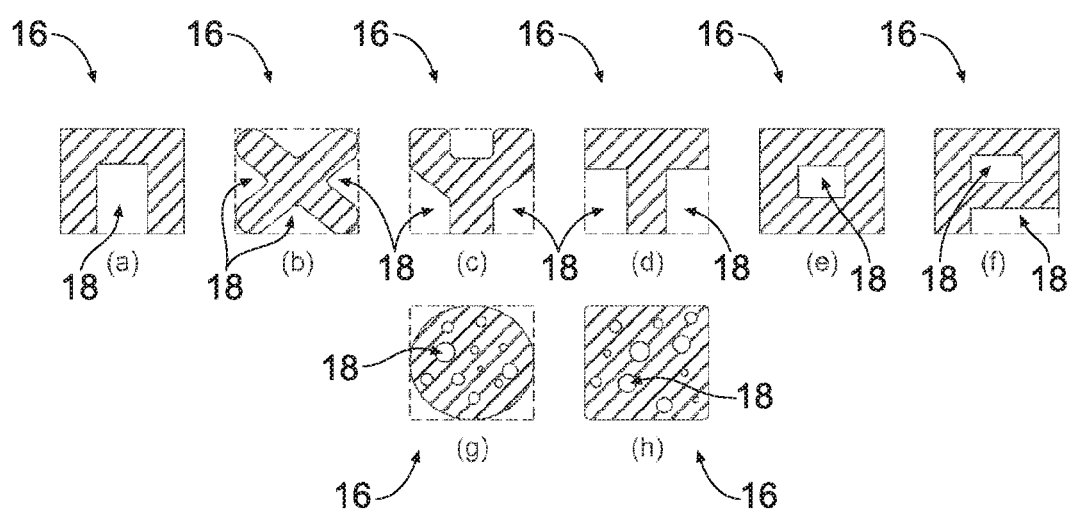

The cross-sectional shape of the compression ring 16 may also differ significantly, as shown in FIG. 10. For example, the cross-sectional shape of the compression ring 16 may be more angular, as shown in FIG. 10(*a*). The cross-section of the compression ring 16 may also be X, Y, T, O or P-shaped, as shown in FIGS. 10(*b*)-(*f*). As shown in FIGS. 10(*g*) and (*h*), the compression ring 16 may also be formed from an open or closed-cell foam having a circular or square cross-section.

However, in all of the examples, the compression ring 16 defines one or more channels or voids 18 (see, e.g., FIGS. 3-4, 7-10), each having an axial extent and a radial extent. In the O and P-shaped examples (see FIGS. 10(*e*) and (*f*)) a void 18 is defined within the cross-section of the compression ring 16. Similarly, where the compression ring 16 is formed from a foam material, the voids 18 are formed by the pores of the material itself. On the other hand, in the U, X, Y and T-shaped examples, one or more voids 18 are formed between the compression ring 16 and the port 4, bracket 6 and/or tube 30. Regardless of the formation of the one or more voids 18, the flexible nature of the compression ring allows the axial extent of the void 18 to be reduced relative the longitudinal axis A through compression of the compression ring 16. This, in turn, results in an increase in the radial extent of the compression ring 16 relative to (e.g., toward) the longitudinal axis A, thus providing the required sealing and fixation. The void 18 magnifies the increase in the radial extent of the compression ring 16 when compared with the deformation of conventional O-rings. Accordingly, the compression ring 16 can have a smaller cross-section and still achieve the same increase in radial extent.

Although not shown, one or more radial openings may be provided through the second section 8*b* of the axial portion 8 in the region of the first radial abutment surface 14*a*. Such openings may be used to visually confirm that the tube 30 is properly seated against the first radial abutment surface 14*a* both before and after the bracket 6 is screwed onto the port 4 to deform the compression ring 16. For example, a pair of radial openings may be provided which are diametrically opposed from one another and thus provide visual access to the tube 30 from either direction.

Figure 1:
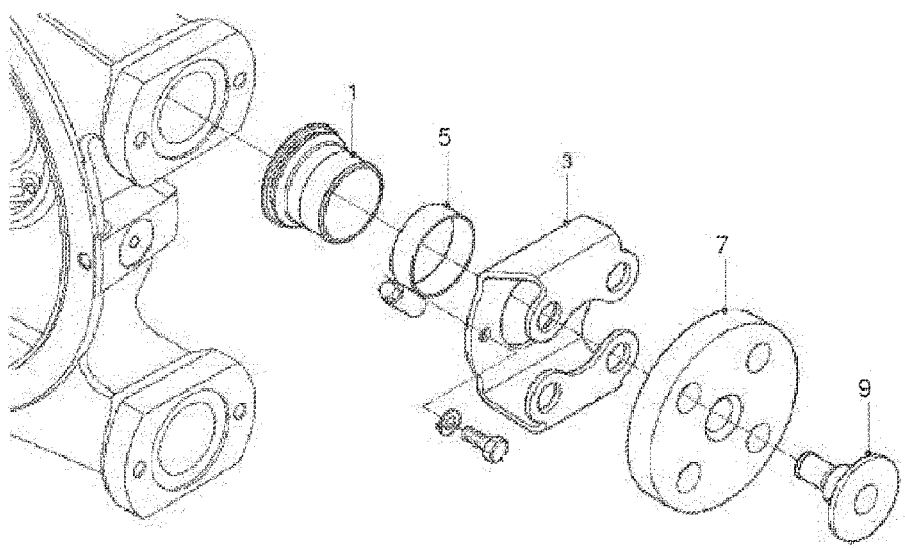
FIG. 1 is an exploded view of an example of a prior art end fitting.
Figure 2:
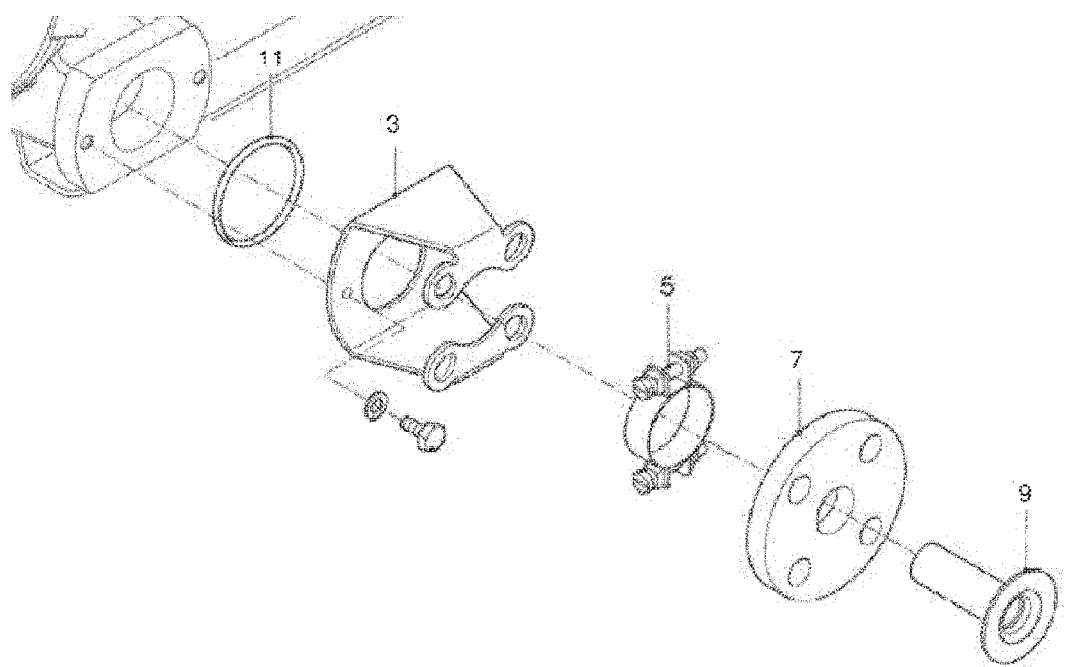
FIG. 2 is an exploded view of another example of a prior art end fitting.

The tube 30 may also project from the bracket 6 or be exposed within the bracket 6 to allow a conventional hose clamp to fastened to the tube 30 (in a similar manner to the hose clamp 5 used in the examples of FIGS. 1 and 2). This may help to retain the tube 30 in place where the pump is to be used in particularly extreme situations (e.g. mining) or where the tube has a particularly large diameter.

The bracket 6 may be connected to the port 4 using alternative means instead of the bolts 20. For example, other types of fasteners may be used to effect axial movement of the bracket 6 relative to the port 4. Further, the bracket 6 and port 4 may be threadedly engaged with one another such that rotation of the bracket 6 relative to the port 4 causes the bracket 6 to translate axially relative to the port 4. This may obviate the need for the inner flange portion 10*b*.

The compression ring 16 may simply be placed over the tube 30 during assembly and need not be carried by the bracket 6, as described previously. The compression ring 16 could alternatively be coupled to the port 4 such that the tube 30 is received through the compression ring 16 when it enters or exits the port 4. The bracket 6 must, however, have a suitable abutment shoulder which cooperates with the port to force the compression ring 16 radially inwards to clamp the tube 30.

The annular tongue 12 may be provided at the port 4 rather than the bracket 6, and the annular groove 22 may be provided as part of the bracket 6 rather than the port 4. Moreover, the annular tongue 12 and groove 22 need not be annular. The tongue and groove may instead be formed by a plurality of discrete interlocking tongue and groove elements. For example, each tongue and groove element may define a projection or a recess having a circular arc. This may be particularly beneficial where the bracket 6 must be positioned in a fixed orientation relative to the port 4. Further, such an arrangement is still able to retain the compression ring 16 in the correct position.

The bracket 6 and insert 32 may be coupled to one another using arrangements other than via the abutting flange portions. In particular, the bracket 6 and/or insert 32 need not be provided with a flange portion. It is, however, beneficial for the bracket 6 and/or insert 32 to have some arrangement which limits the depth to which the insert 32 can be inserted. Yet, this may be provided by one or more protrusions or tabs extending radially from the insert 32 or by a local thickening of the insert 32.

Although the tube 30 has been described as such, it may instead be a hose. Further, the bracket 6 and insert 32 may be integrally formed with one another such that the tube 30 is received between the bracket 6 (specifically, the second section 8b of the axial portion) and the insert 32 (specifically, the axial portion 34).

Figure 11:
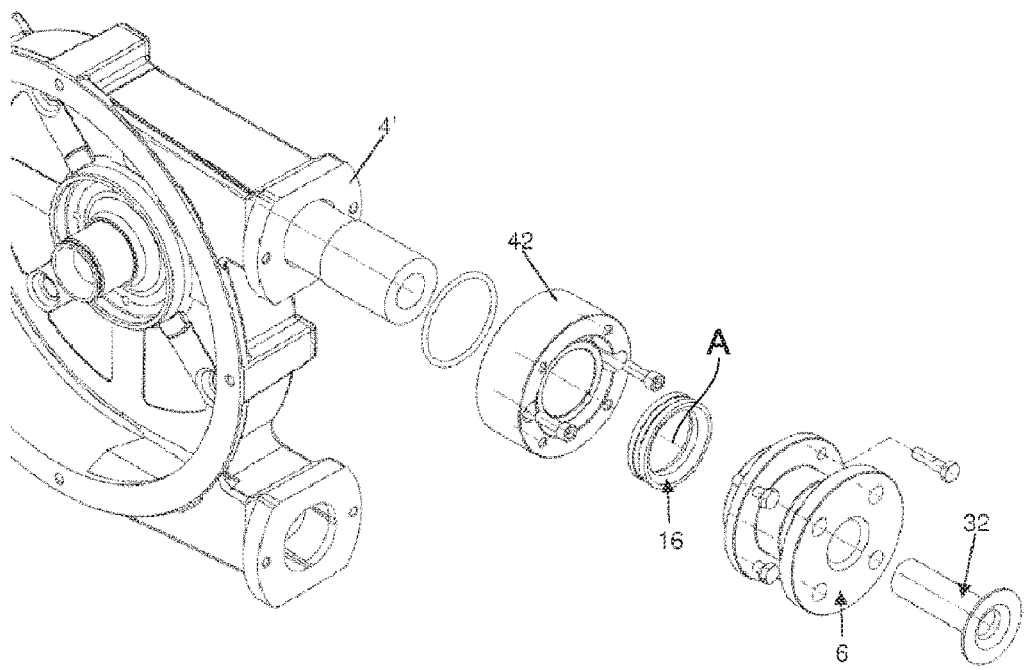
FIGS. 11 and 12 show exploded views of the end fitting with an additional adaptor member which can be used to retrofit the end fitting to an existing pump.
Figure 12:
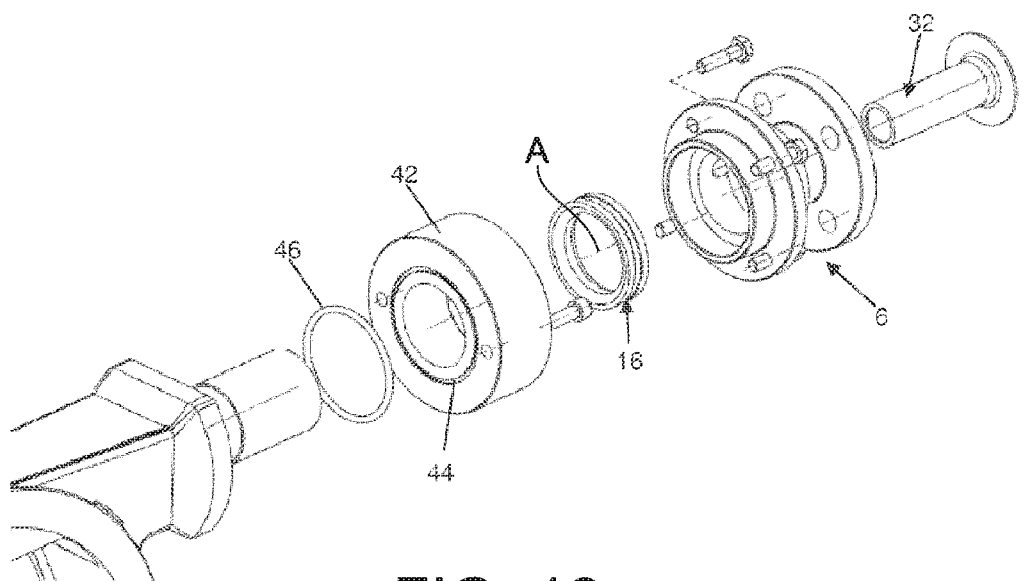

The end fitting 2 described herein may be retrofit to existing pumps via a simple adaptor member 42, as shown in FIGS. 11 and 12. In such existing pumps, the port 4' may have a flat end surface against which a conventional end fitting abuts via threaded bores provided in the port 4'. The adaptor member 42 therefore provides the features described previously, such as the annular groove 22, etc. and thus convert the port 4' into the port 4. The adaptor member 42 is affixed to the port 4' using the conventional threaded bores of the port 4'. A rear surface of the adaptor member 42 is provided with an annular groove 44. The annular groove 44 receives a conventional O-ring 46 which is disposed between the adaptor member 42 and the port 4' to provide a seal therebetween.

Although the end fitting 2 has been described with reference a peristaltic pump, it may also be used in other applications in which a tube passes through a cavity and sealing is required with the tube and between the tube and the cavity. For example, the end fitting 2 could be used in a similar manner with a pulsation dampener which may be employed to reduce the pulses created in the discharge line of a peristaltic pump. Such a pulsation dampener may comprise a hose which passes through a pressure vessel containing a compressed gas, such as air or nitrogen. The pressure vessel must therefore be sealed against the hose to prevent the compressed gas from exiting the pressure vessel. The hose is connected to the discharge line and again this must be a fluid tight seal to avoid leakage of the pumped fluid. The end fitting 2 of the invention could thus be employed in a similar manner to that described previously to provide such sealing. Other applications will also be apparent to those skilled in the art.

The invention is not limited to the embodiments described herein, and may be modified or adapted without departing from the scope of the present invention.

The invention claimed is:

1. An end fitting for a tube housed by a cavity and defining a longitudinal axis, the end fitting comprising:
    a bracket having a first abutment shoulder that opposes a port of the cavity;
    a compression ring disposed against the first abutment shoulder of the bracket and configured to receive the tube therethrough, the compression ring defining a void having an axial extent and a radial extent;
    an insert configured to be received within the interior of the tube such that the insert overlaps and extends beyond the compression ring; and
    a fastener for connecting the bracket to the port so as to draw the bracket axially towards the port, whereby the compression ring is compressed between the first abutment shoulder and the port so as to seal the port and compress the tube against the insert, wherein the shape of the void is defined by the deformation of the compression ring;
    wherein the shape of the void reduces axially, in length, relative to the longitudinal axis and the shape of the void increases radially, in depth, relative to the longitudinal axis, in a final assembled state, when the compressed compression ring seals the port and compresses the tube against the insert.

2. An end fitting as claimed in claim 1, wherein the compression ring has an inner diameter that, in an at-rest configuration, is greater than or substantially equal to an outer diameter of the tube, and that, in a compressed configuration, is less than the outer diameter of the tube.

3. An end fitting as claimed in claim 1, wherein the void is defined by the cross-section of the compression ring and is located between the compression ring and the tube, bracket, and/or port.

4. An end fitting as claimed in claim 3, wherein the cross-section of the compression ring defines one or more annular channels.

5. An end fitting as claimed in claim 4, wherein the cross-section of the compression ring defines a plurality of annular channels spaced axially from one another.

6. An end fitting as claimed in claim 4, wherein the cross-section of the compression ring defines a plurality of annular channels oriented in different directions with respect to one another.

7. An end fitting as claimed in claim 1, wherein the void is located within the cross-section of the compression ring.

8. An end fitting as claimed in claim 7, wherein the compression ring is hollow.

9. An end fitting as claimed in claim 7, wherein the compression ring is formed by a foam material having pores which define a plurality of voids.

10. An end fitting as claimed in claim 1, wherein the bracket comprises an annular portion that is configured to receive the tube therein.

11. An end fitting as claimed in claim 10, wherein the annular portion has a second abutment shoulder against that the tube abuts.

12. An end fitting as claimed in claim 11, wherein an opening is provided through the annular portion, the opening being located adjacent the second abutment shoulder.

13. An end fitting as claimed in claim 1, wherein the insert comprises an axial portion that is configured to be received within the interior of the tube.

14. An end fitting as claimed in claim 13, wherein the insert further comprises one or more projections that extend radially from the axial portion.

15. An end fitting as claimed in claim 14, wherein the diameter of the one or more projections is greater than the inner diameter of the tube, and the diameter of the remainder of the axial portion is less than the inner diameter of the tube.

16. An end fitting as claimed in claim 1, wherein the insert comprises an end portion that abuts the bracket.

17. An end fitting as claimed in claim 1, wherein the bracket comprises an inner portion that abuts against a surface of the port so as to limit the compression of the compression ring.

18. An end fitting as claimed in claim 1, wherein the bracket comprises a tongue or groove that is received by or receives a corresponding groove or tongue of the port.

19. An end fitting as claimed in claim 18, wherein the tongue and groove are annular, the tongue housing the compression ring.

20. A peristaltic pump comprising an end fitting as claimed in claim 1.

21. An end fitting for a tube housed by a cavity, the end fitting comprising:
- a bracket having a first abutment shoulder that opposes a port of the cavity;
- a compression ring disposed against the first abutment shoulder of the bracket and configured to receive the tube therethrough, wherein the compression ring defines a void;
- an insert configured to be received within an interior of the tube such that the insert overlaps and extends beyond the compression ring; and
- a fastener for connecting the bracket to the port so as to draw the bracket axially towards the port, whereby the compression ring is configured for arrangement in:
  - a non-compressed state defined by:
    - a first axial extent of a first shape of the void; and
    - a first radial extent of the first shape of the void;
  - a compressed state defined by:
    - a second axial extent of a second shape of the void; and
    - a second radial extent of the second shape of the void, wherein the first axial extent is greater than the second axial extent, wherein the first radial extent is less than the second radial extent.

* * * * *